(12) United States Patent
Kim et al.

(10) Patent No.: US 7,646,447 B2
(45) Date of Patent: Jan. 12, 2010

(54) FLAT PANEL DISPLAY

(75) Inventors: Jae Kwang Kim, Yongin (KR); Chung Woo Suh, Gwacheon (KR); Young Bee Chu, Suwon (KR); Jae Lok Cha, Goyang (KR); Jeung Soo Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 358 days.

(21) Appl. No.: 11/584,718

(22) Filed: Oct. 19, 2006

(65) Prior Publication Data

US 2007/0132908 A1    Jun. 14, 2007

(30) Foreign Application Priority Data

Dec. 12, 2005    (KR) .................. 10-2005-0121734

(51) Int. Cl.
*G02F 1/1333*    (2006.01)

(52) U.S. Cl. ........................................... 349/58
(58) Field of Classification Search .................. 349/58
See application file for complete search history.

(56) References Cited

U.S. PATENT DOCUMENTS

| 6,919,937 | B2 * | 7/2005 | Kim et al. | 349/58 |
| 2001/0036057 | A1 * | 11/2001 | Fukuyoshi | 361/681 |
| 2006/0290836 | A1 * | 12/2006 | Chang | 349/58 |
| 2007/0008452 | A1 * | 1/2007 | Kim et al. | 349/58 |
| 2008/0192170 | A1 * | 8/2008 | Fu et al. | 349/58 |

* cited by examiner

*Primary Examiner*—Sung H Pak
(74) *Attorney, Agent, or Firm*—Innovation Counsel LLP

(57) ABSTRACT

The present invention relates to a flat panel display having integral fastening structures for holding the top and bottom chassis. The flat panel display comprises a mold frame enclosing an internal storage space and having a plurality of fastening hooks protruding outward from a side surface thereof; a bottom chassis having a plurality of first coupling openings fastened to the plurality of fastening hooks of the mold frame; and a top chassis having a fastening structure fastened to the bottom chassis, wherein the fastening structure is formed on the area where the mold frame is fastened to the bottom chassis.

16 Claims, 15 Drawing Sheets

FLAT PANEL DISPLAY

RELATED APPLICATIONS

This application claims priority under 35 U.S.C. §119 of Korean Patent Application No. 10-2005-0121734, filed Dec. 12, 2005, the disclosure of which is incorporated herein by reference in its entirety.

BACKGROUND

1. Field of the Invention

The present invention relates to integral fastening structures for holding together the top and bottom chassis of flat panel displays, and flat panel displays incorporating the same.

2. Related Art

Among flat panel displays, the application range of liquid crystal displays (LCDs) has been extended because of its light weight, thinness, low drive power requirements, full color capabilities and high resolution characteristics. LCDs are currently used in computers, notebook computers, PDAs, telephones, TVs, audio/video devices and the like. Such LCD panels are used to modulate light transmitted by the panels in accordance with image signals applied to control switches arrayed in a matrix therein and then display a desired image on a surface of the display. The LCD device comprises an LCD panel having a surface on which images are displayed directly, an LCD drive IC for operating the LCD panel, a backlight unit used as a light source of the LCD, and a chassis used to fasten respective components of the LCD into a single, integrated panel unit.

Recently, two features have emerged as being of major interest to users of medium- or small-sized LCDs, viz., a high luminance and a reduced thickness. The latter feature is one of particular importance to manufacturers of host devices that incorporate LCD panels, and accordingly, a variety of fastening structures have been developed with a view towards reducing panel thickness. Among the various prior art fastening structures that have been developed, the most commonly employed structure is one in which a flange-shaped fastening portion is formed on a module of an LCD that is to be incorporated in the host device, as illustrated in FIG. 1.

FIG. 1 is a perspective view of a generic LCD. With referring to FIG. 1, the LCD comprises an LCD panel 10, a mold frame 20 in which the LCD panel 10 is received, and a bottom chassis 30 that is fastened to the mold frame 20. A flange-shaped fastening portion 25 is formed on a side surface of the mold frame 20 and is used to fasten the LCD to a host device.

FIGS. 2A and 2B are upper front perspective and side elevation views, respectively, of an LCD incorporating dual liquid crystal panels in accordance with the prior art. Referring to FIGS. 2A and 2B, the LCD comprises a sub-side LCD panel 10, a mold frame 20 for accommodating a backlight unit therein, and a bottom chassis 30 fastened to the mold frame 20. Additionally, a flange-shaped fastening portion 25 is formed on a side surface of the mold frame 20 for fastening the LCD to a host device. The sub-side LCD panel 10 is disposed on an outer side of the bottom chassis 30, and a main-side LCD panel (not illustrated) is disposed on an opposite side of the mold frame 20.

FIGS. 3A and 3B are enlarged plan and cross-sectional views, respectively, of the regions encircled by phantom lines in FIGS. 1 and 2B, showing corresponding portions of the LCD mold frame 20 and bottom chassis 30 at which the chassis portions are fastened together in accordance with the prior art fastening structure. Referring to these figures, a hook 23, which protrudes a selected distance outward, is formed on a side surface of the mold frame 20. A coupling opening 35 corresponding to the shape and location of the hook 23 is formed in a sidewall of the bottom chassis 30, together with a rectangular hook fixing portion 33, which tapers inwardly from the sidewall of the bottom chassis. The resilient material of the mold frame and chassis enable the two fastening portions to be pressed together in an over-center, snap-in locking engagement with each other to fasten the two parts together.

In the prior art fastening structure described above, flange-shaped fastening portions are formed on a side surface of the mold frame for fastening the panel to the host device. However, as will be appreciated, there are many constraints on the design of the side surfaces of an LCD. In particular, the space needed for the hooks used to fasten the bottom chassis to the top chassis is insufficient due to the presence of the flange-shaped fastening portions. As a result, the size and/or number of the hooks must be decreased, and hence, the strength of the joints that fasten the top and bottom chassis together is correspondingly reduced. This, in turn, substantially reduces the ability of the LCD panel to withstand external shocks and impacts acting on the panel.

BRIEF SUMMARY

The present invention has been conceived to overcome the aforementioned problems of the prior art fastening structures. In accordance with the exemplary embodiments thereof described herein, the present invention provides a flat panel display having top and bottom chassis which incorporate an integrated fastening structure that not only optimally utilizes the limited space available on a side surface of a flat panel display after the provision thereon of panel-to-host fastening features, but also substantially increases the strength of the joints used to fasten the top and bottom chassis together.

According to an exemplary embodiment, a flat panel display comprises a mold frame enclosing an internal storage space and having a plurality of fastening hooks protruding outward from a side surface thereof, a bottom chassis having a plurality of first coupling openings fastened to the plurality of fastening hooks of the mold frame; and a top chassis having a fastening structure fastened to the bottom chassis, wherein the fastening structure is formed on the area where the mold frame is fastened to the bottom chassis.

A better understanding of the above and many other features and advantages of the display fastening structures of the present invention and the displays incorporating them may be obtained from the detailed description of the exemplary embodiments thereof below, particularly if such consideration is made in conjunction with the several views of the appended drawings, wherein like reference numerals are used to identify like elements illustrated in one or more of the figures thereof.

DETAILED DESCRIPTION

Figure 1:
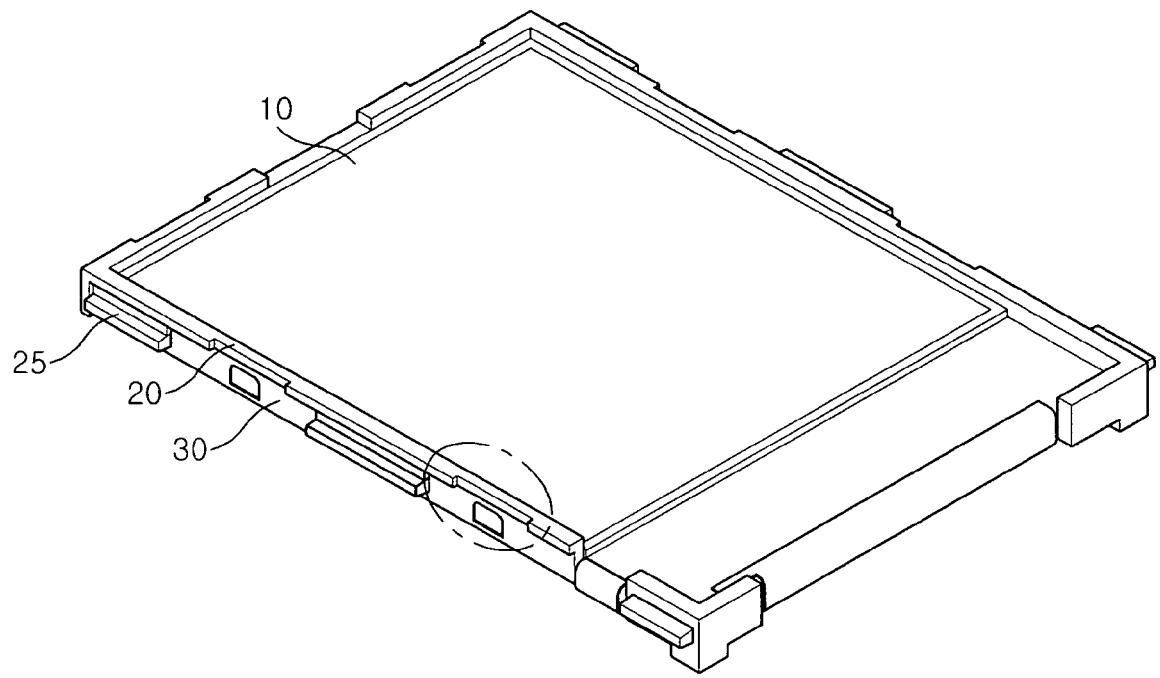
FIG. 1 is an upper front perspective view of an exemplary embodiment of a generic liquid crystal display (LCD) in accordance with the prior art.
Figure 2A:
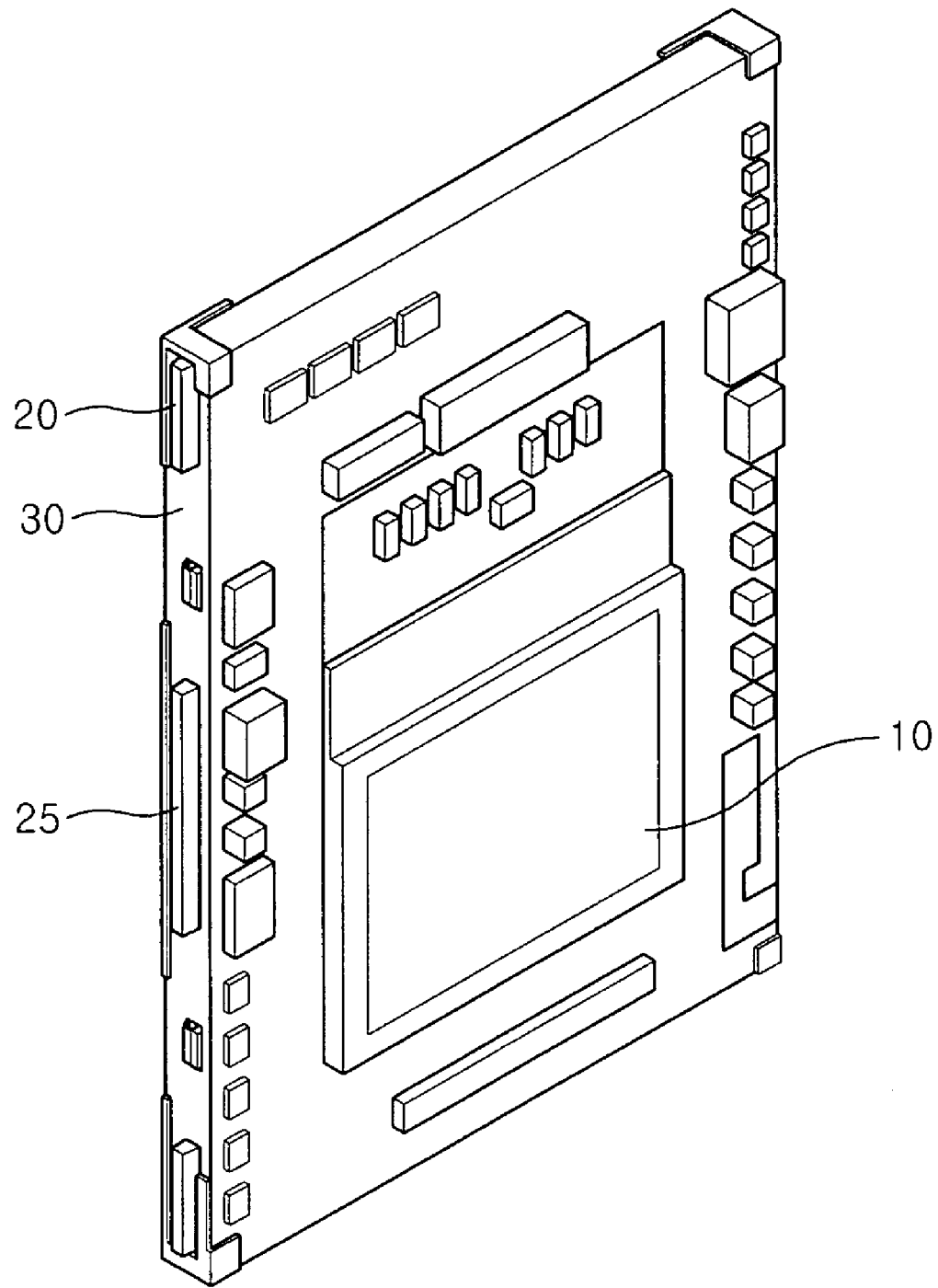
FIGS. 2A and 2B are upper front side perspective and side elevation views, respectively, of an exemplary LCD incorporating a dual liquid crystal panel in accordance with the prior art.
Figure 2B:
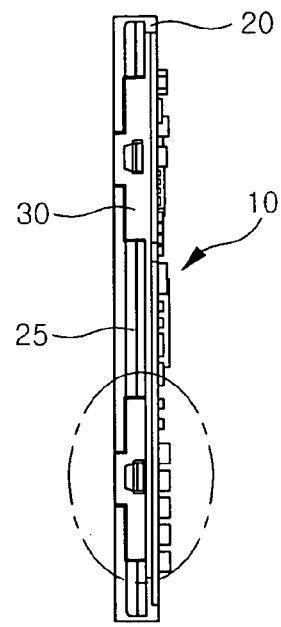
Figure 3A:
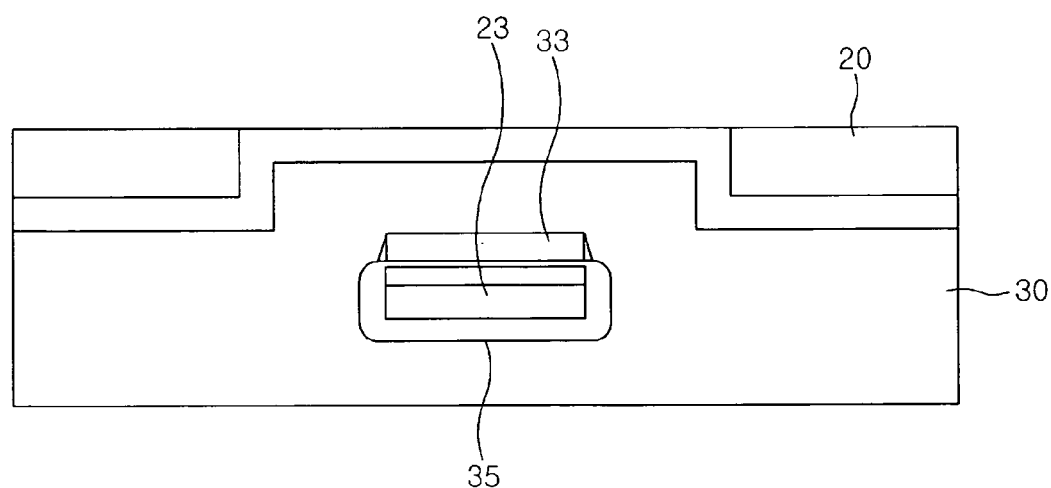
FIGS. 3A and 3B are enlarged partial side elevation and cross-sectional views, respectively, of adjacent portions of a mold frame and a bottom chassis of an LCD incorporating a fastening structure of the prior art for fastening the two chassis components together.
Figure 3B:
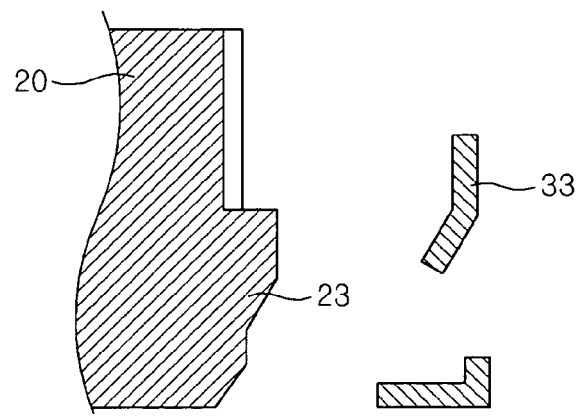
Figure 4A:
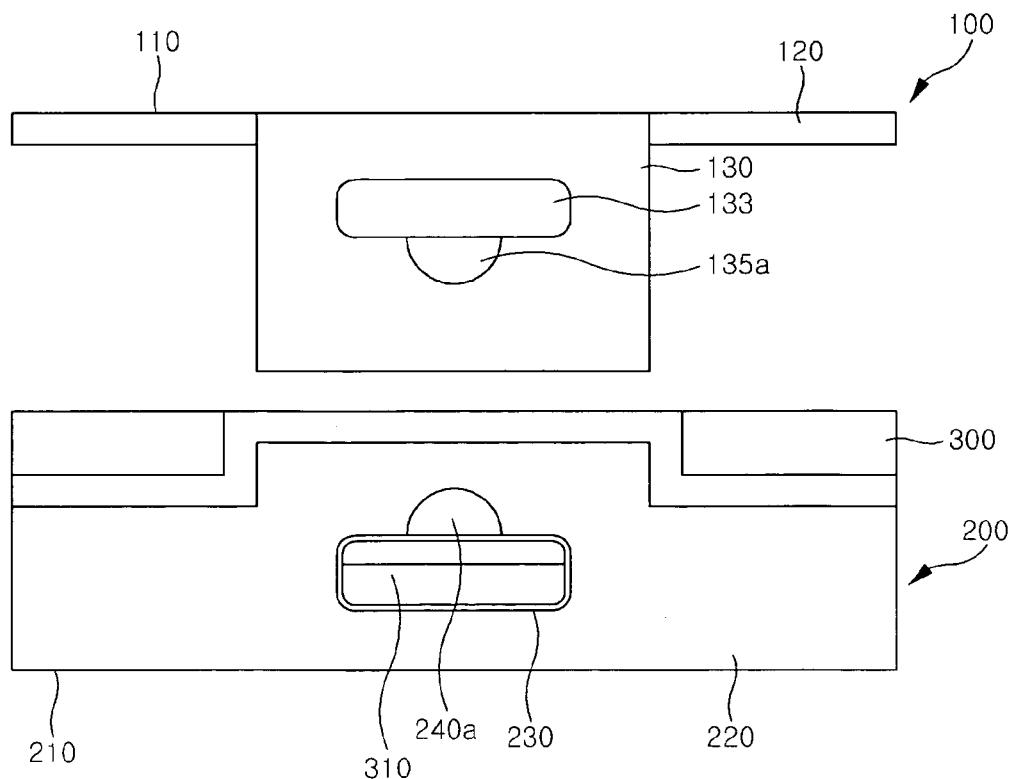
FIGS. 4A and 4B are partial side elevation and upper side perspective views, respectively, of an exemplary first embodiment of a fastening structure for fastening a top and bottom chassis of an LCD together in accordance with the present invention, showing the chassis components prior to being fastened together.
Figure 4B:
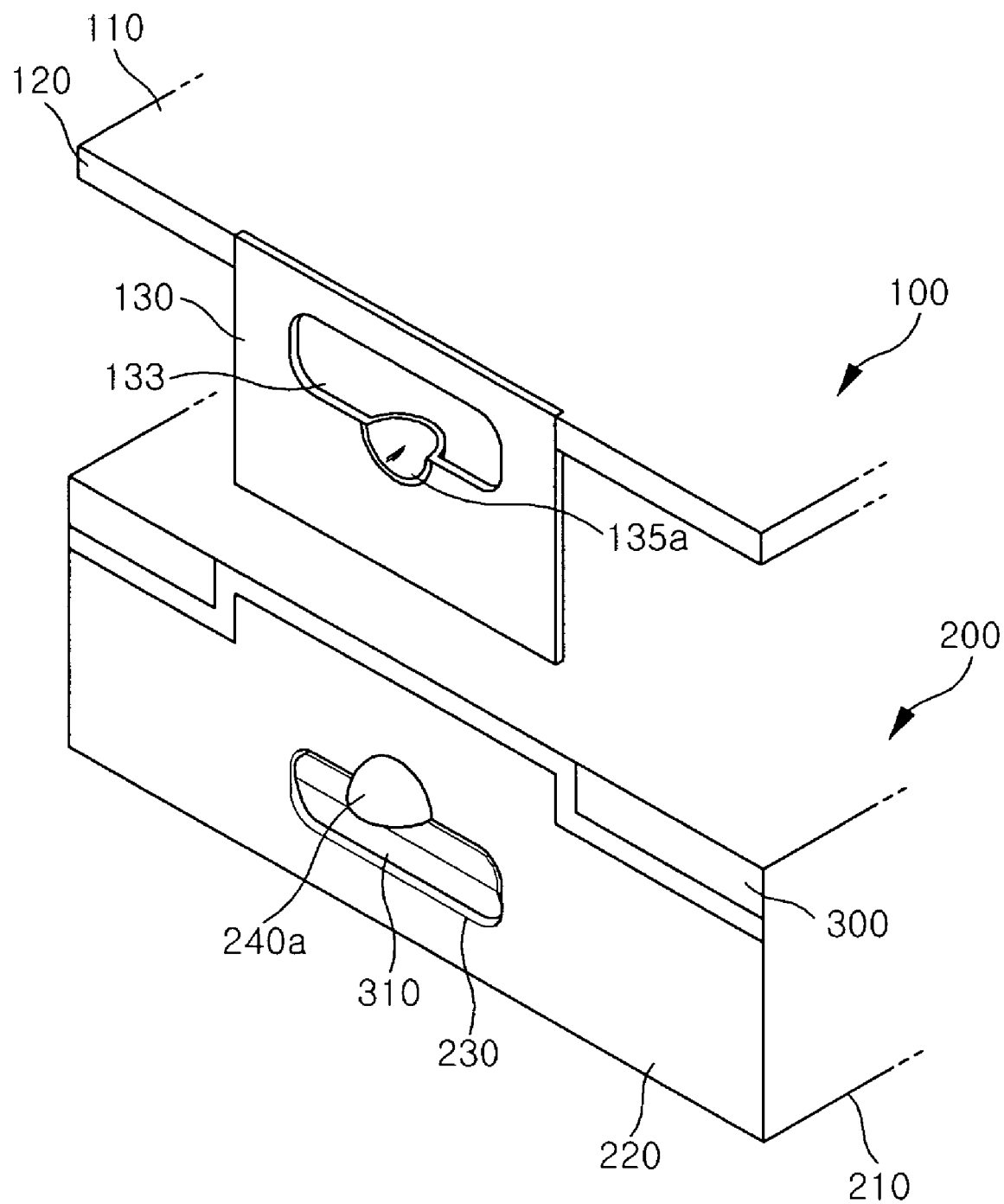

FIGS. 4A and 4B are partial side elevation and upper side perspective views, respectively, of the top and bottom chassis 100 and 200 of an LCD prior to being fastened together with an exemplary first embodiment of a fastening structure in accordance with the present invention. As illustrated in FIGS. 4A and 4B, the LCD of the first embodiment comprises a top chassis 100, a bottom chassis 200 and a mold frame 300. The mold frame 300 defines an internal storage space for accommodating a backlight unit and an LCD panel (not illustrated). The bottom chassis 200 is fastened together with the mold frame 300 to surround the bottom and side surfaces of the mold frame 300, and the top chassis 100 is fastened together with the bottom chassis 200 to surround a portion of the top surface of the LCD panel and the side surfaces of the mold frame 300.

As may be seen by reference to the figures, the top chassis 100 comprises a base plate 110 that includes an opening (not illustrated) through which a display surface of the LCD panel is exposed to the outside, a generally vertical sidewall 120, and a fastening portion 130 that is formed on the sidewall 120 to extend perpendicularly downward from the base plate and be fastened together with the bottom chassis 200 in the manner described below. In the first exemplary embodiment illustrated, only a portion of the sidewall 120 of the top chassis 100 containing a single fastening portion 130 is shown for convenience of illustration. However, it should be understood that a plurality of the fastening portions 130 can be formed on the sidewall 120 of the base plate of the top chassis.

As illustrated in FIGS. 4A and 4B, a rectangular coupling opening 133 is formed near the center of the fastening portion 130, and a semi-hemispherical protrusion 135a is formed immediately below the coupling groove 133 to protrude inward from the fastening portion 130. The inward protrusion 135a may be formed integrally with, e.g., molded in, the fastening portion 130 during manufacture. Additionally, although the protrusion 135a of the exemplary embodiment is illustrated as being semi-hemispherical in shape, the present invention is not limited thereto. That is, the protrusion 135a may be formed with various other shapes.

The bottom chassis 200 of the first embodiment comprises a base plate 210 that extends around a bottom surface of the mold frame 300, a generally vertical sidewall 220 that extends perpendicularly upward from an edge of the base plate 210, a rectangular coupling opening 230 formed in the sidewall 220 for coupling with a hook 310 of the mold frame 300 described below, and a semi-hemispherical protrusion 240a formed immediately above the coupling groove 230 to protrude outward from the sidewall 220 for fastening with the top chassis 100. Like the inward protrusion 135a above, the outward protrusion 240a may be integrally formed with, e.g., molded in, the sidewall 220 during manufacture, and likewise, may be formed in a variety of shapes. Further, it should be understood that, although only a portion of the sidewall 220 of the bottom chassis 200 containing a single coupling opening 230 and outward protrusion 240a is shown in the first embodiment for convenience of illustration, a plurality of the coupling openings 230 and associated protrusions 240a can be provided, and in general, the fastening structures of the top chassis 100 and bottom chassis 200 of the present invention are provided in corresponding pairs.

As described above, the mold frame 300 defines an internal space for accommodating a backlight unit, an LCD panel and the like, and a fastening hook 310 of a selected length is formed on a side surface of the mold frame 300 to protrude outward therefrom such that it can be fastened together with the top and bottom chassis 100 and 200. As illustrated in the figures, the fastening hook 310 is arranged to extend through the rectangular coupling opening 230 of the bottom chassis 200.

Figure 4C:
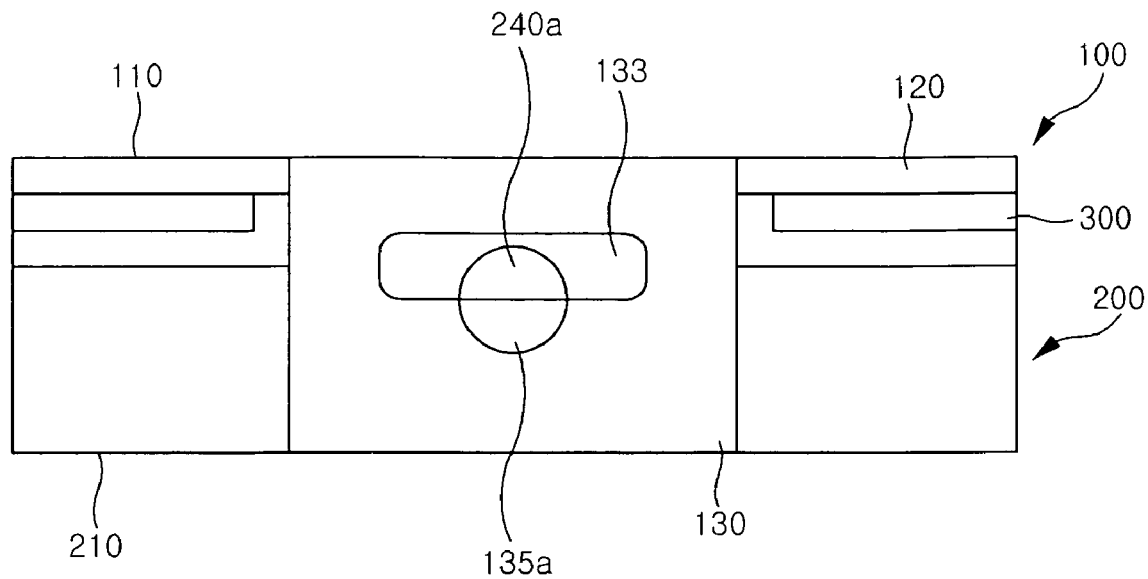
FIGS. 4C and 4D are partial side elevation and upper side perspective views, respectively, of the top and bottom chassis of FIGS. 4A and 4B after being fastened together.
Figure 4D:
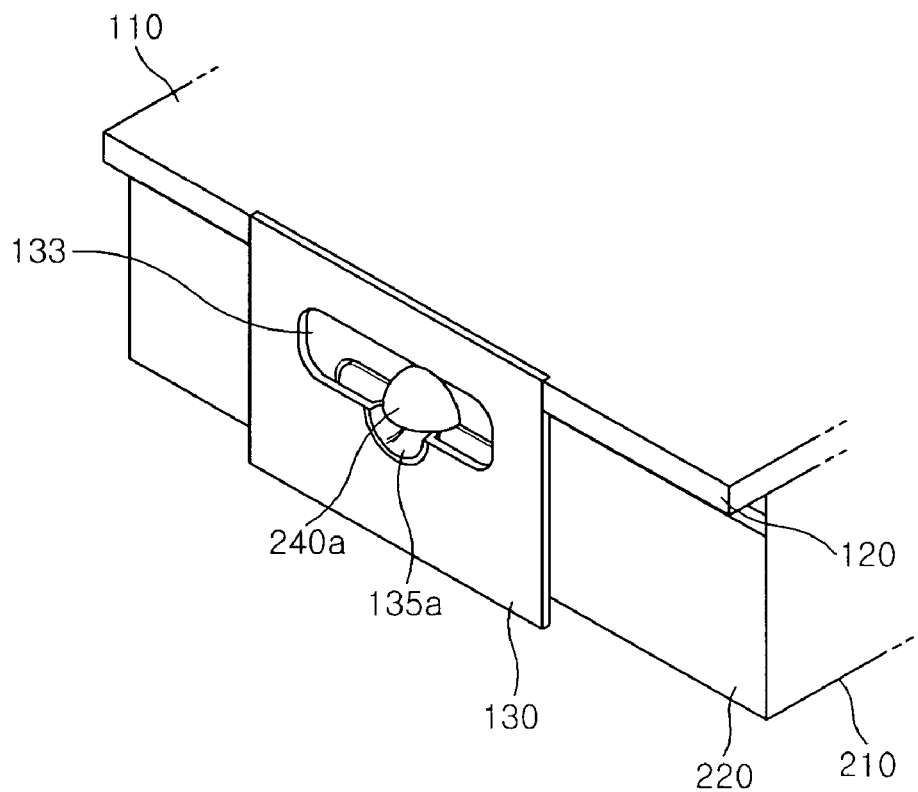

FIGS. 4C and 4D are partial side elevation and upper side perspective views, respectively, showing the top and bottom chassis of the LCD after they have been fastened together with the exemplary first embodiment of the fastening structure of the present invention. As may be seen in the figures, when the top chassis 100 is fastened to the bottom chassis 200, the coupling opening 133 of the fastening portion 130 of the top chassis 100 is coupled to and fixed with the outward protrusion 240a formed on the sidewall 220 of the bottom chassis 200, and the inward protrusion 135a on the coupling portion 130 of the top chassis 100 is correspondingly coupled to and fixed with the bottom chassis 200 while pushing against the fastening hook 310 of the mold frame 300. Thus, the force holding the top and bottom chassis 100 and 200 to each other is substantially increased, and further, since the top and bottom chassis 100 and 200 are fastened to each other within the same, relatively small regions, the space on the side surface of an LCD necessary to effect the improved fastening is substantially decreased.

Figure 5A:
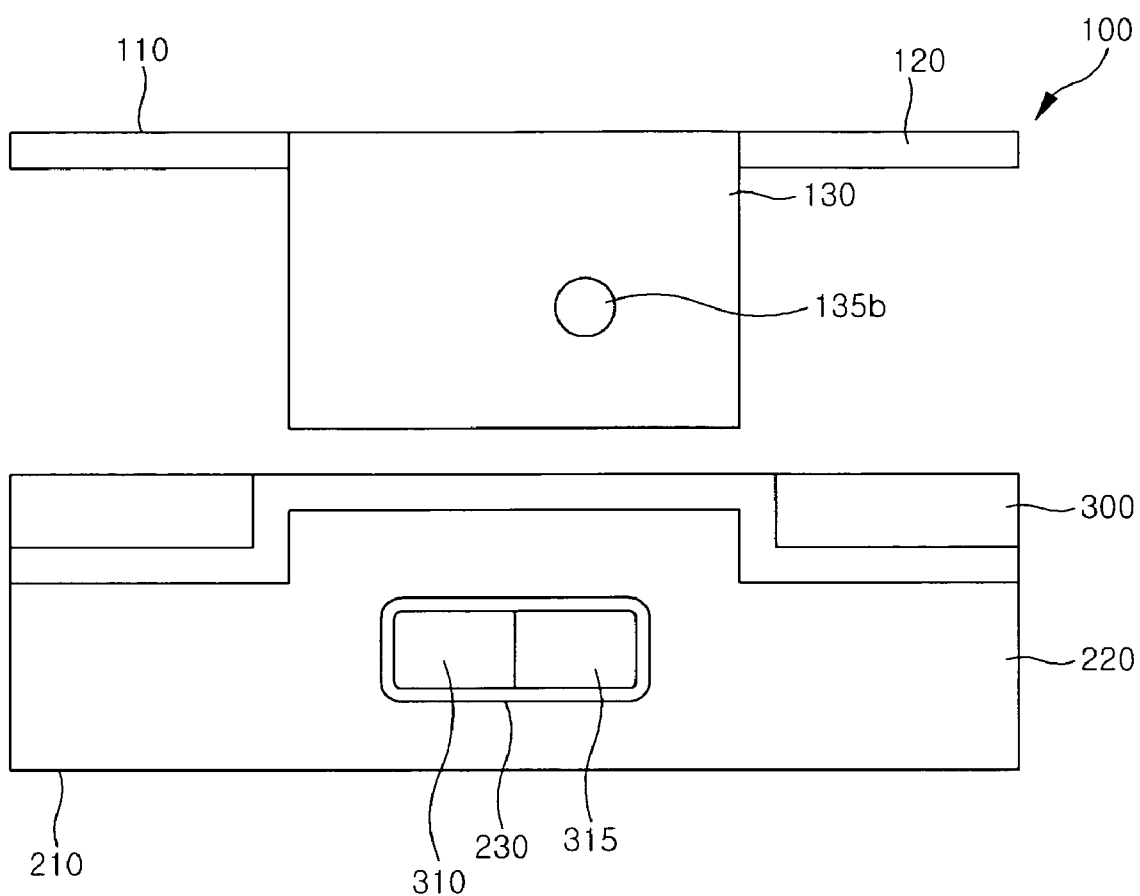
FIGS. 5A and 5B are partial side elevation and an upper side perspective views, respectively, of an exemplary second embodiment of a fastening structure for fastening a top and bottom chassis of an LCD together in accordance with the present invention, showing the chassis components prior to being fastened together.
Figure 5B:
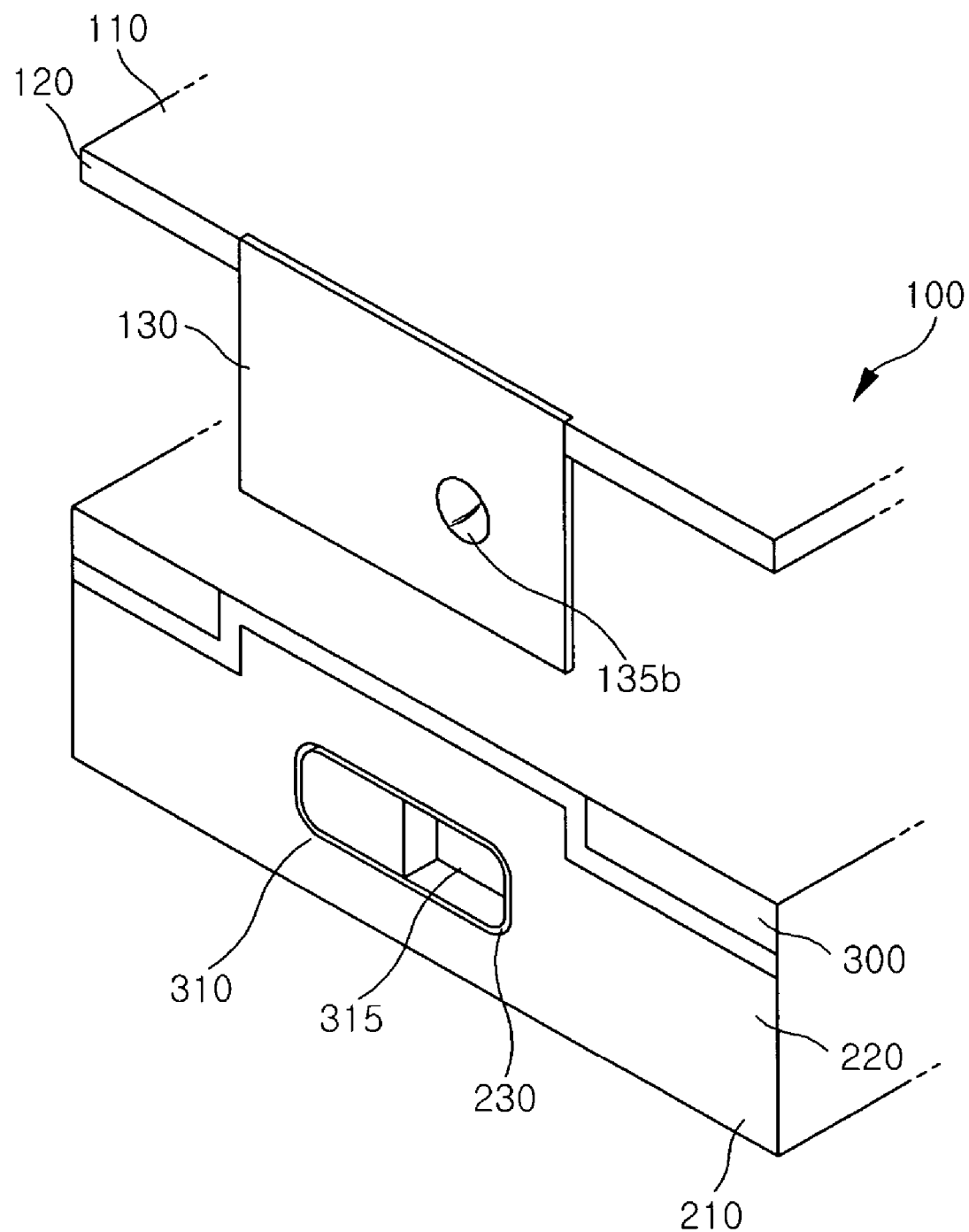

FIGS. 5A and 5B are partial side elevation and upper side perspective views, respectively, of the top and bottom chassis 100 and 200 of an LCD prior to being fastened together with an exemplary second embodiment of a fastening structure in accordance with the present invention. In FIGS. 5A and 5B, the LCD of the second embodiment, like the first, comprises a top chassis 100, a bottom chassis 200 and a mold frame 300.

The top chassis 100 comprises a base plate 110 that includes an opening (not illustrated) through which a display surface of the LCD panel (not illustrated) is exposed to the outside, a generally vertical sidewall 120, and a fastening portion 130 that is formed on the sidewall 120 to extend perpendicularly downward from the base plate and be fastened with the bottom chassis 200, as described below. As above, it should be understood that, although only a portion of the sidewall 120 of the top chassis 100 is shown for convenience of illustration, a plurality of the fastening portions 130 can be formed on the sidewall 120.

A cylindrical protrusion 135b is formed in a specific region of the fastening portion 130 to protrude inward from the fastening portion. The inward protrusion 135b can be integrally formed with, e.g., molded into, the fastening portion 130 during manufacture, and further, although shown as cylindrical in shape, may incorporate a shape other than cylindrical.

The bottom chassis 200 comprises a base plate 210 that surrounds a bottom surface of the mold frame 300, a generally vertical sidewall 220, and a rectangular coupling opening 230 formed in the sidewall 220 for coupling with a fastening hook 310 of the mold frame 300, as described below. And as above, although only a single coupling opening 230 is shown in the figure, a plurality of the coupling openings 230 corresponding to the number of the top panel fastening structures are generally provided in the sidewall 220.

A fastening hook 310 having a selected length is formed on a side surface of the mold frame 300 to protrude outwardly such that it can be fastened together with the top chassis 100 and the bottom chassis 200. The mold frame 300 is positioned on the bottom chassis such that the fastening hook 310 extends through the coupling opening 230 of the bottom chassis 200. Further, the hook 310 has a width selected such that, when the hook is disposed at one side of the rectangular opening 230 of the sidewall, a second coupling opening 315 with a specific shape, size and location is defined adjacent to the hook 310. In particular, the size and location of the opening 315 correspond to those of the inwardly extending protrusion 135b of the fastening portion 130 of the top chassis 100.

Figure 5C:
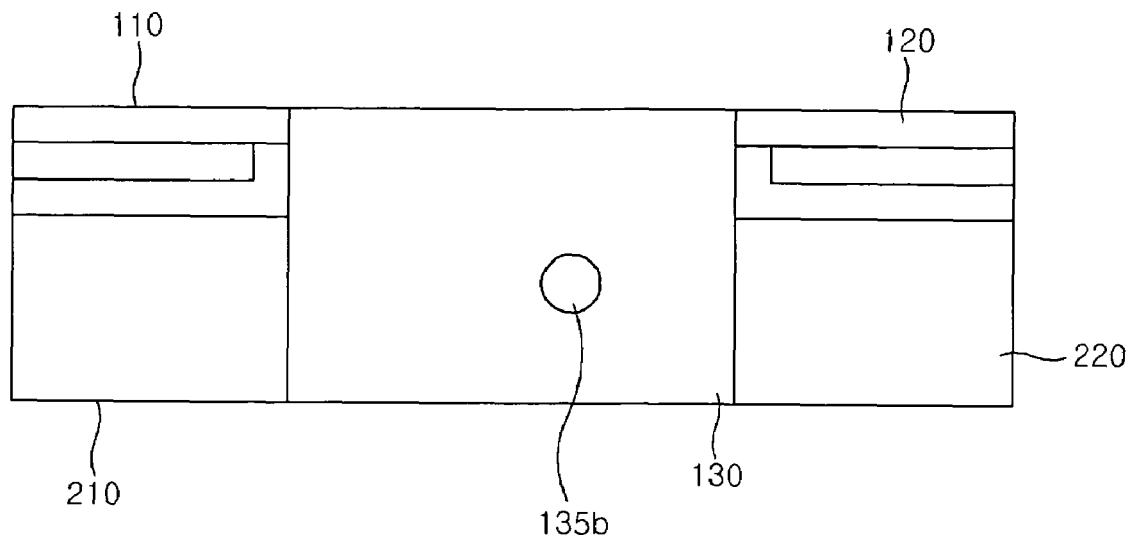
FIGS. 5C and 5D are partial side elevation and upper side perspective views, respectively, of the top and bottom chassis of FIGS. 5A and 5B after being fastened together.
Figure 5D:
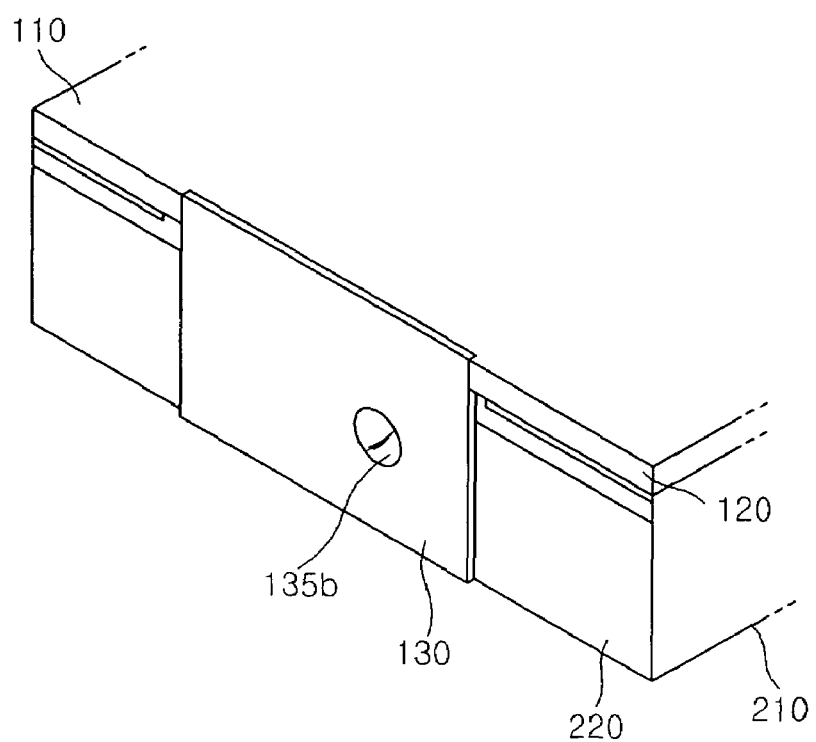

FIGS. 5C and 5D are partial side elevation and upper side perspective views, respectively, showing the top and bottom chassis of the LCD after they have been fastened together with the exemplary second embodiment of the fastening structure of the present invention. As shown in the figures, when the top chassis 100 is fastened to the bottom chassis 200, the protrusion 135b on the fastening portion 130 of the top chassis 100 extends into and interlocks with the opening 315 formed adjacent to the fastening hook 310 of the mold frame 300.

Figure 6A:
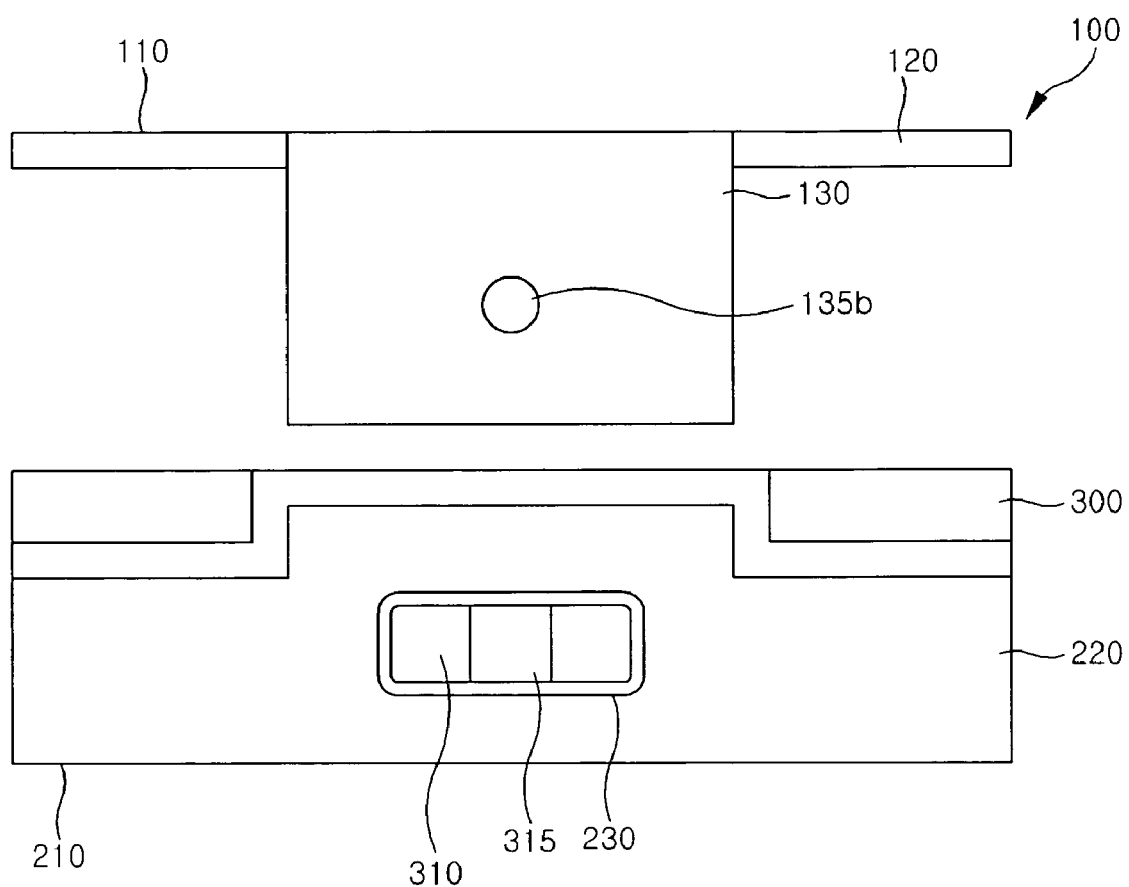
FIGS. 6A and 6B are partial side elevation and upper side perspective views, respectively, of an exemplary third embodiment of a fastening structure for fastening a top and bottom chassis of an LCD together in accordance with the present invention, showing the chassis components prior to being fastened together.
Figure 6B:
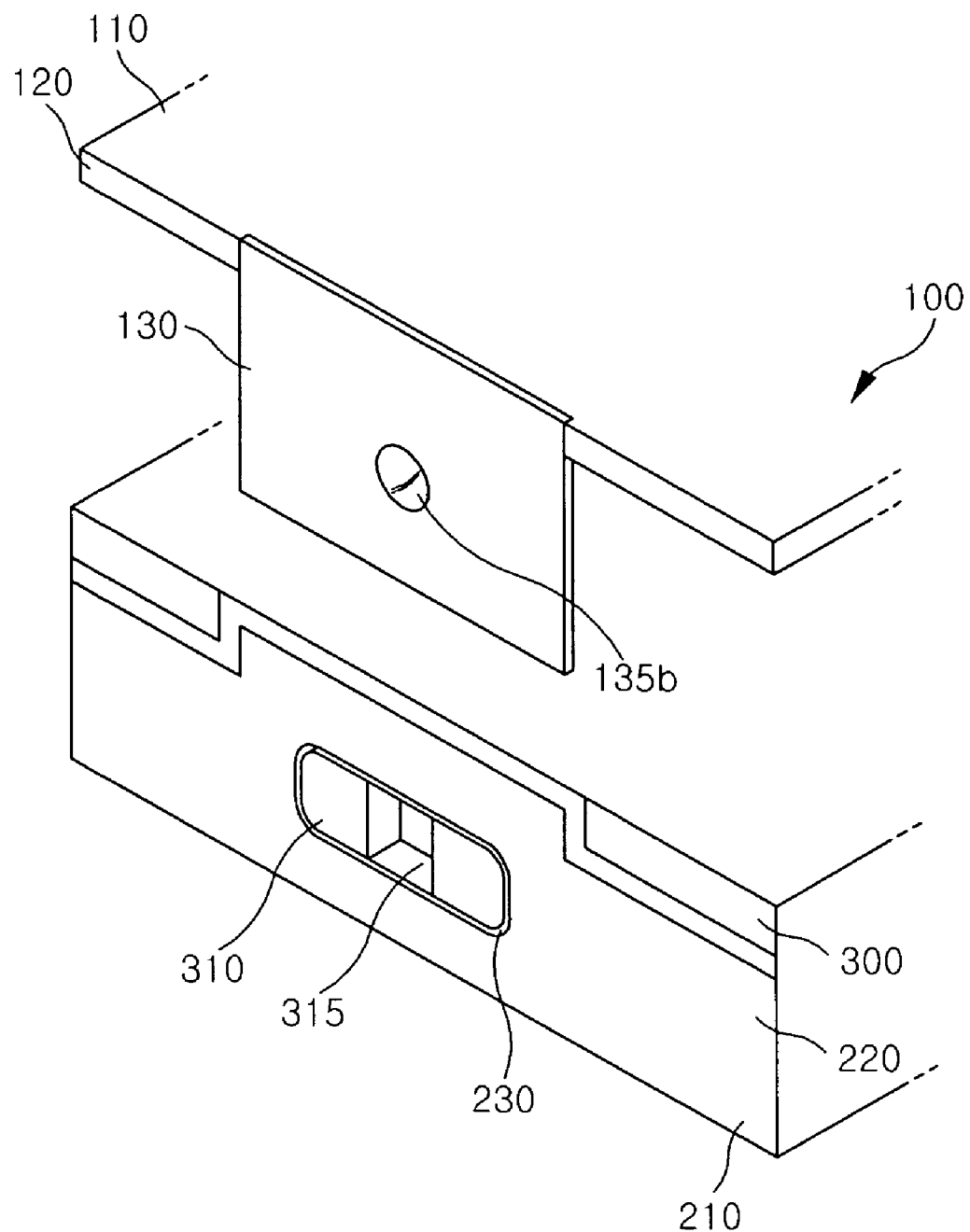

FIGS. 6A and 6B are partial side elevation and upper side perspective views, respectively, of the top and bottom chassis 100 and 200 of an LCD prior to being fastened together with a fastening structure in accordance with an exemplary third embodiment of the present invention. The third embodiment differs from the second embodiment primarily in the location of the opening used to couple with protrusions of the top chassis and mold frame, but in other respects, the two embodiments are otherwise very similar to each other. Thus, the following description focuses on the differences between the two embodiments.

As illustrated in FIGS. 6A and 6B, the LCD of the third embodiment comprises a top chassis 100, a bottom chassis 200 and a mold frame 300. The top chassis 100 comprises a base plate 110 that includes an opening (not illustrated) through which a display surface of the LCD panel (not illustrated) is exposed to the outside, a generally vertical sidewall 120, and a fastening portion 130 that is formed on the sidewall 120 to extend perpendicularly downward from the base plate and be fastened together with the bottom chassis 200. A cylindrical protrusion 135b is formed on a predetermined region of the fastening portion 130 to protrude inward from the fastening portion, and as above, the protrusion 135b may be integrally formed with the fastening portion 130, and include a shape other than cylindrical.

The exemplary third embodiment includes a fastening hook 310 having a selected length formed on a side surface of the mold frame 300 such that it can be fastened together with the top and bottom chassis 100 and 200, as described below. As illustrated in the figures, the hook 310 is bifurcated to define a recess 315 of a selected size in the center of the hook 310. In particular, the recess 315 is sized and located to correspond to the size and location of the inward protrusion 135b of the top chassis 100.

Figure 6C:
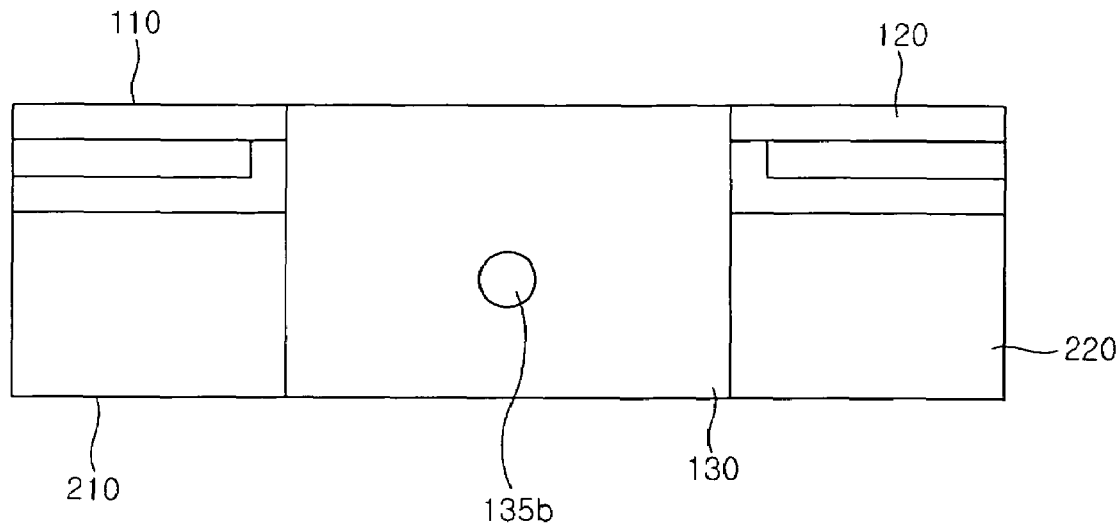
FIGS. 6C and 6D are partial side elevation and upper side perspective views, respectively, of the top and bottom chassis of FIGS. 6A and 6B after being fastened together.
Figure 6D:
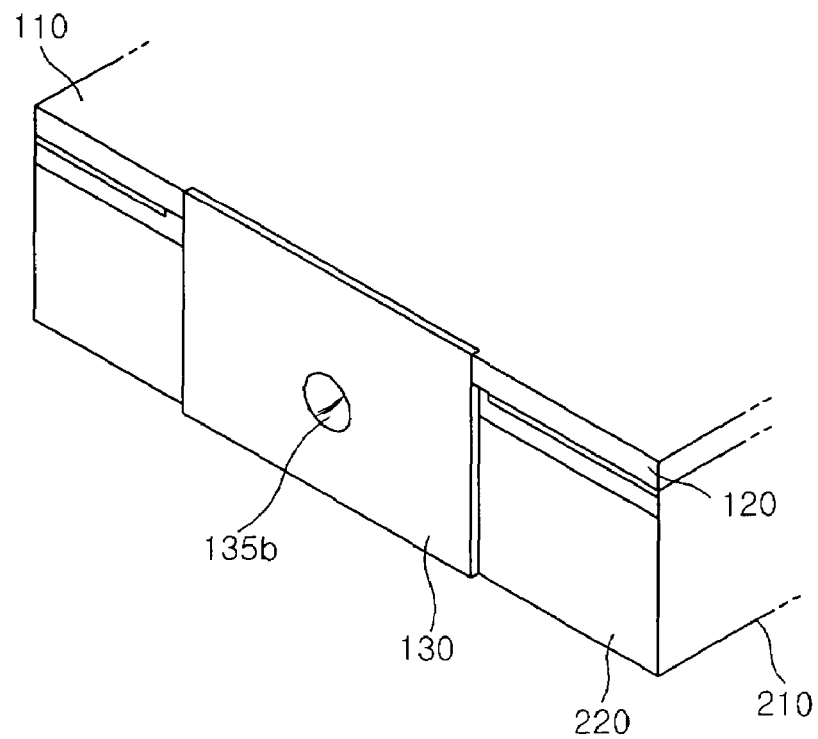

FIGS. 6C and 6D are partial side elevation and upper side perspective views, respectively, showing the top and bottom chassis of the LCD after they have been fastened together with the exemplary third embodiment of the fastening structure of the present invention. As illustrated in the figures, when the top chassis 100 is fastened onto the bottom chassis 200, the inward protrusion 135b on the fastening portion 130 of the top chassis 100 extends into and interlocks with the recess 315 formed at the center of the fastening hook 310.

Figure 7A:
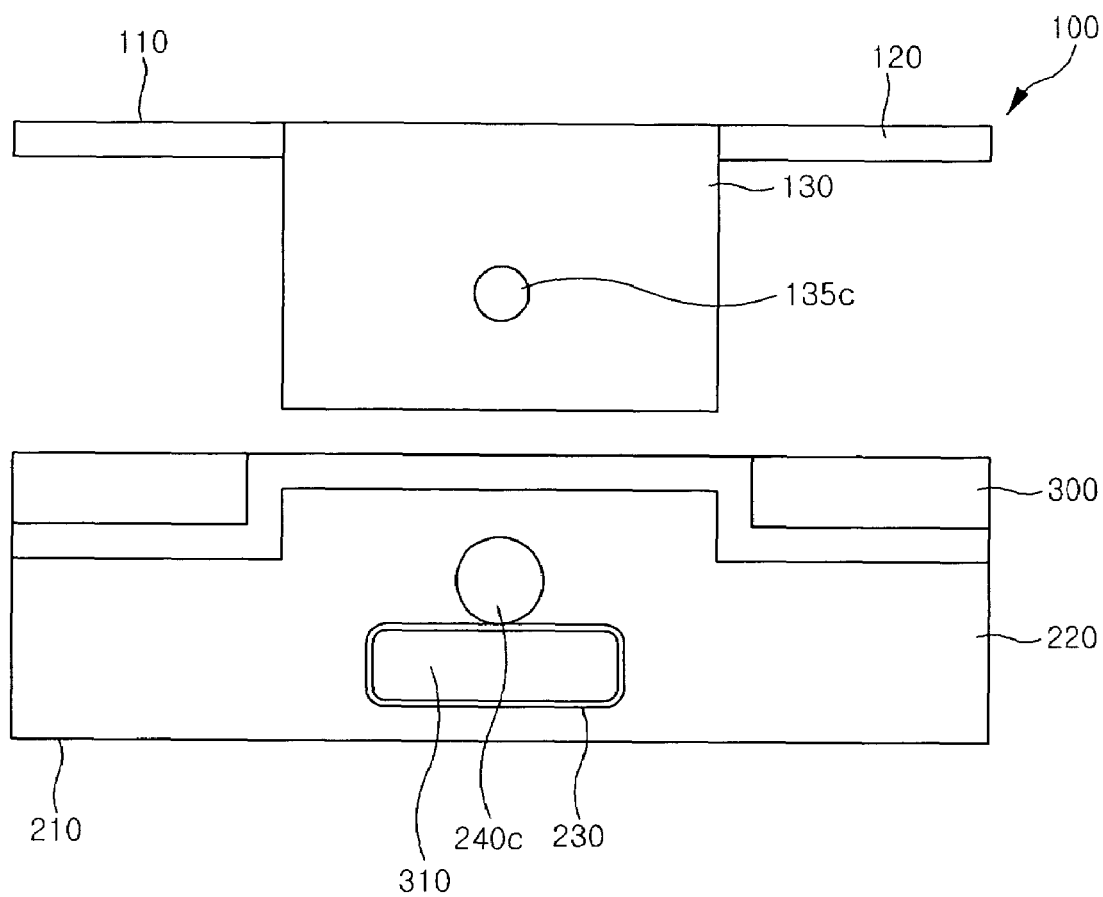
FIGS. 7A and 7B are partial side elevation and upper side perspective views, respectively, of an exemplary fourth embodiment of a fastening structure for fastening a top and bottom chassis of an LCD together in accordance with the present invention, showing the chassis components prior to being fastened together; and, FIGS. 7C and 7D are partial side elevation and upper side perspective views, respectively, of the top and bottom chassis of FIGS. 7A and 7B after being fastened together.
Figure 7B:
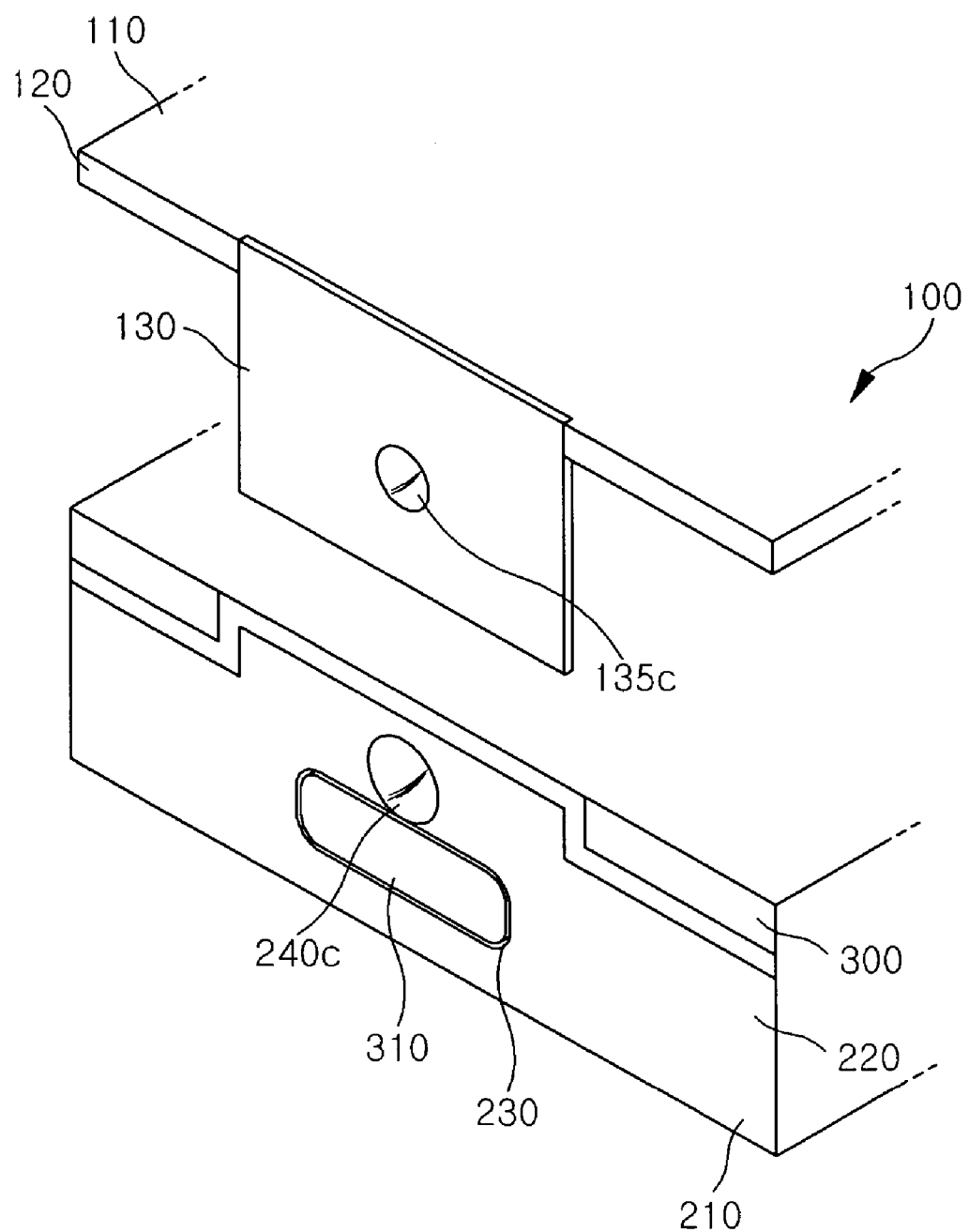

FIGS. 7A and 7B are partial side elevation and upper side perspective views, respectively, of the top and bottom chassis 100 and 200 of an LCD prior to being fastened together with an exemplary fourth embodiment of a fastening structure in accordance with the present invention. As in the other exemplary embodiments above, the top chassis 100 comprises a base plate 110 that includes an opening (not illustrated) through which a display surface of the LCD panel is exposed to the outside, a generally vertical sidewall 120, and a fastening portion 130 that is formed on the sidewall 120 to extend perpendicularly downward from the base plate and be fastened together with the bottom chassis 200. And as in the above exemplary embodiments, although only a single fastening structure is shown, it should be understood that a plurality of corresponding pairs of the structures can be provided.

A cylindrical protrusion 135c is formed in a predetermined region of the fastening portion 130 to protrude inwardly from the fastening portion 130. As above, the protrusion 135c may be integrally formed with the fastening portion 130, and may incorporate a shape other than cylindrical, e.g., hemispherical.

The bottom chassis 200 comprises a base plate 210 which surrounds a bottom surface of the mold frame 300, a vertical sidewall 220 that extends upward from an edge of the base plate 210, a coupling opening 230 formed on the sidewall 220 for coupling with a fastening hook 310 of the mold frame 300 described below, and a cylindrical protrusion 240c, which may be integrally formed with the sidewall 220, disposed immediately above the coupling groove 230 to protrude inwardly from the sidewall 220 and be fastened with the top chassis 100. Like the inward protrusion 135a of the fastening portion 130, the inward protrusion 240c may various shapes other than cylindrical, e.g., hemispherical. However, the protrusion 240c of the bottom chassis 200 and the protrusion 135c of the top chassis 100 are preferably formed at positions and incorporate shapes that correspond to each other. Additionally, it is preferred that the protrusion 240c of the bottom chassis 200 be formed slightly larger than the protrusion 135c of the top chassis 100.

As described above, a fastening hook 310 having a selected length is formed on a side surface of the mold frame 300 for fastening of the latter with the top and bottom chassis 100 and 200, with the hook 310 arranged to extend outwardly into the coupling opening 230 of the bottom chassis 200.

Figure 7C:
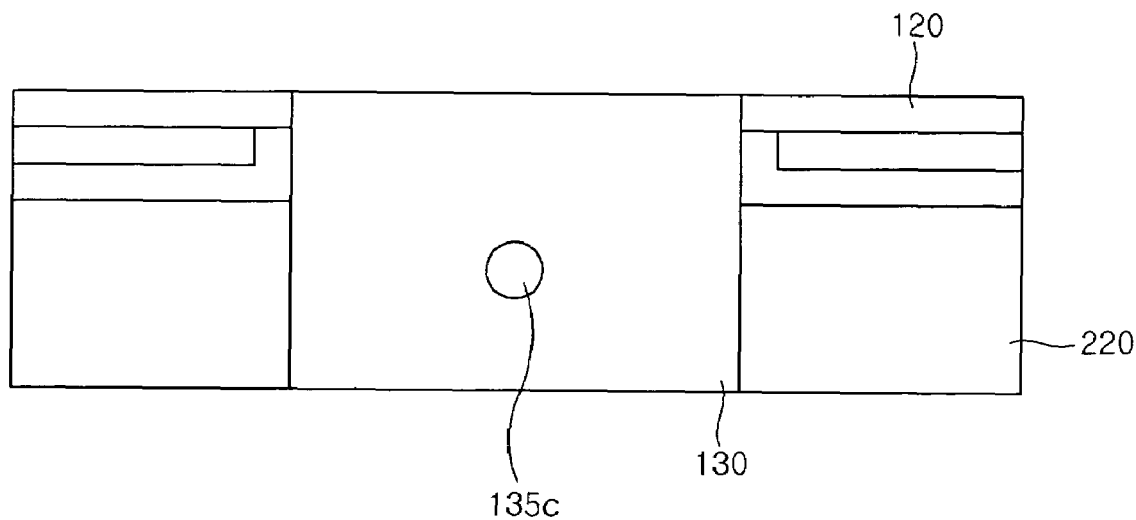
Figure 7D:
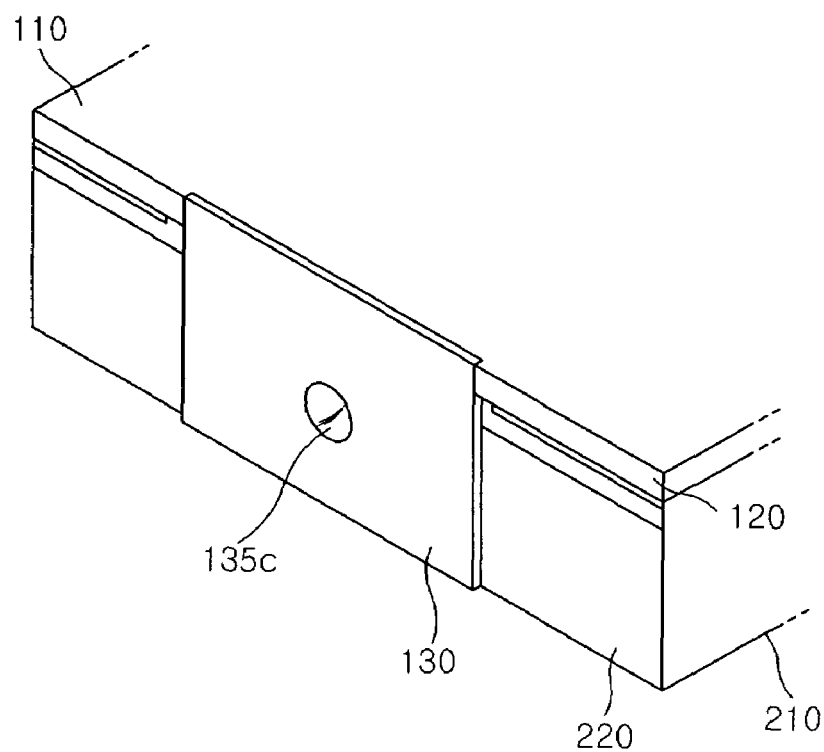

FIGS. 7C and 7D are partial side elevation and upper side perspective views, respectively, showing the top and bottom chassis of the LCD after they have been fastened together with the exemplary fourth embodiment of the fastening structure of the present invention. As illustrated in the figures, when the top chassis 100 is fastened onto the bottom chassis 200, the fastening hook 310 of the mold frame 300 extends into the coupling opening of 230 of the bottom chassis 200, and the inward protrusion 240c on the sidewall 220 of the bottom chassis 200 pushes against the side of the mold frame 300, and since it is arranged above the hook 310 of the mold frame 300, simultaneously locks the hook 310 in position. Further, the inward protrusion 135c of the top chassis 100 engages and locks into the inward protrusion 240c formed on the sidewall 220 of the bottom chassis 200.

According to the exemplary embodiments of the present invention described above, top and bottom LCD panel chassis are formed with integrated fastening structures that advantageously increase the available useable space on the side surfaces the display while enhancing the fastening forces holding the chassis components together. Additionally, the novel chassis fastening structures enable a desirable reduction in design constraints to be achieved in the design of the panel-to-host fastening devices.

Although the exemplary embodiments have been described and illustrated herein in conjunction with LCD panels, it should be understood that the present invention is not limited such display types. For example, the present invention can also be applied to a variety of other types of displays, such as an organic light emitting diode display ("OLED"), which uses the electroluminescence principle for generating light, or a plasma display panel ("PDP") display in which a plurality of small cells are arranged between two substrates and a gas (neon or argon) discharge is generated between electrodes (positive and negative) above and below the substrates such that the cells cause self luminescence by means of ultraviolet rays generated due to the gas discharge, thereby reproducing color images, or like displays. Accordingly, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A flat panel display, comprising:
a mold frame enclosing an internal storage space and having a fastening hook protruding outward from a side surface thereof;
a bottom chassis including an upwardly extending vertical sidewall having a first coupling opening for receiving the fastening hooks of the mold frame, and further including a first protrusion protruding outwardly from the first coupling opening; and
a top chassis including an downwardly extending vertical sidewall having a second coupling opening and a second protrusion protruding inward from the second coupling opening for fastening with the bottom chassis.

2. The flat panel display of claim 1, wherein the first protrusion is formed above the first coupling openings, and the second protrusion is formed below the second coupling openings.

3. The flat panel display of claim 1, wherein the first and second protrusions are semi-cylindrical in shape.

4. The flat panel display of claim 1, wherein the first protrusion is integrally formed with the sidewall of the bottom chassis, and the second protrusion is integrally formed with the sidewall of the top chassis.

5. The flat panel display of claim 1, wherein the first protrusion fastens within the second coupling openings.

6. A flat panel display, comprising:
a mold frame enclosing an internal storage space;
a bottom chassis fastened to the mold frame, and comprising a first base plate, a sidewall extending upwardly from an edge of the first base plate, and a plurality of first coupling openings formed in the sidewall, and
a top chassis comprising a second base plate having an opening for a surface of a display and a vertical sidewall extending downwardly from an edge of the second base plate, a plurality of fastening portions formed on the sidewall including an inward protrusion having a predetermined shape formed on a corresponding one of each of the fastening portions for fastening with the first coupling opening of the bottom chassis.

7. The flat panel display of claim 6, wherein the inward protrusions are cylindrically shaped.

8. The flat panel display of claim 6, wherein the inward protrusions are integrally formed with the fastening portions.

9. The flat panel display of claim 6, wherein the mold frame includes a plurality of fastening hooks protruding outward from a side surface thereof and being receiving in corresponding ones of the first coupling openings, and wherein the inward protrusions are formed at respective positions corresponding to the respective positions of corresponding ones of the fastening hooks.

10. A flat panel display, comprising:
a mold frame enclosing an internal storage space and having a plurality of fastening hooks protruding outward from a side surface thereof
wherein the bottom chassis comprises a first base plate, a sidewall extending upwardly from an edge of the first base plate, a plurality of first coupling openings formed in the sidewall for fastening with corresponding ones of the fastening hooks of the mold frame, and a plurality of first inward protrusions having a specific shape formed on the sidewall, and
wherein the top chassis comprises a second base plate having an opening for a surface of a display and a vertical sidewall extending downward from the second base plate, and a plurality of fastening portions each including a second coupling opening formed on the sidewall for fastening with the bottom chassis, and outward protrusions having a specific shape formed on a corresponding one of each of the fastening portions.

11. The flat panel display of claim 10, wherein the inward and outward protrusions have a cylindrical shape or a hemispherical shape.

12. The flat panel display of claim 10, wherein the inward protrusions are integrally formed with the sidewall of the bottom chassis and the outward protrusions are integrally formed with corresponding ones of the fastening portions.

13. The flat panel display of claim 10, wherein the inward protrusions are larger than the outward protrusions.

14. The flat panel display of claim 10, wherein the inward protrusions are formed above corresponding ones of the first coupling openings.

15. The flat panel display of claim 11, wherein the outward protrusions are formed at respective positions corresponding to the respective positions of corresponding ones of the inward protrusions.

16. The flat panel display of claim 1, wherein the display is a liquid crystal display.

* * * * *